United States Patent [19]

Colomban et al.

[11] Patent Number: 5,344,512
[45] Date of Patent: Sep. 6, 1994

[54] MULTILAYER FIBER-MATRIX CERAMIC COMPOSITE MATERIAL AND PROCESS FOR ITS PRODUCTION

[75] Inventors: Philippe Colomban, Fresnes; Martine Menet, Elancourt; Emmanuelle Mouchon, Fontenay aux Roses; Gilles Courtemanche, Paris; Michel Parlier, Voisins le Bretonneux, all of France

[73] Assignee: Office National d'Etudes et de Recherches Aerospatiales, Chatillon Sous Bagneux, France

[21] Appl. No.: 830,904

[22] Filed: Feb. 4, 1992

[30] Foreign Application Priority Data

Feb. 4, 1991 [FR] France ............................... 91 01237

[51] Int. Cl.$^5$ .................. C03B 8/00; C03C 14/00; C04B 35/00
[52] U.S. Cl. ....................... 156/89; 156/155; 156/307.4; 156/314; 156/297; 156/299
[58] Field of Search ............... 156/89, 155, 307.4; 428/224, 245, 260, 269, 367

[56] References Cited

U.S. PATENT DOCUMENTS

| 4,460,639 | 7/1984 | Chi et al. ........................ 156/89 X |
| 4,568,594 | 2/1986 | Hordonneau et al. ............ 428/113 |
| 5,078,818 | 1/1992 | Han et al. ..................... 427/443.2 X |

FOREIGN PATENT DOCUMENTS

| 0130105 | 1/1985 | European Pat. Off. |
| 0308742 | 3/1989 | European Pat. Off. |
| 0327783 | 8/1989 | European Pat. Off. . |
| 2545003 | 4/1983 | France . |
| 2190929 | 12/1987 | United Kingdom . |

OTHER PUBLICATIONS

"Advances in Ceramics", vol. 21; Ceramic Powder Science 1987, ACS, Inc., Colomban Sol-Gel Synthesis etc. pp. 139–154.
Chem. Absts. 82556d, vol. 112, No. 10,5, Mar. 1990, p. 328.
Chem. Absts. 233579h, vol. 114, No. 24,17, Jun. 1991, p. 302.
Chem. Absts. 233580b, vol. 114, No. 24,17, Jun. 1991, p. 302.

Primary Examiner—David A. Simmons
Assistant Examiner—M. Curtis Mayes
Attorney, Agent, or Firm—Dennison, Meserole, Pollack & Scheiner

[57] ABSTRACT

Woven or nonwoven long fiber sheets filled with two precursors each constituting an intermediate stage in a process for the preparation of a vitreous ceramic composition by the sol-gel route by hydrolysis and polycondensation using alcoholates or analogous compounds as the starting materials, that is to say an interface precursor in the form of a gel rich in water and a matrix precursor in the form of discrete particles capable of sintering at relatively low temperature, are stacked; the fibrous structure is compressed in the direction of stacking and the whole is heat-treated in order to convert the two precursors into a continuous matrix.

23 Claims, 2 Drawing Sheets

MULTILAYER FIBER-MATRIX CERAMIC COMPOSITE MATERIAL AND PROCESS FOR ITS PRODUCTION

The invention relates to composite materials comprising a vitreous and/or ceramic matrix reinforced by long fibers.

EP-A-0 130 105 describes a process for the production of such a composite material, in which process the interstices of a fibrous structure are filled with a first precursor in the fluid state and with a second precursor in the form of discrete particles and the whole is heat-treated in order to convert the first precursor and the second precursor into a continuous matrix.

In this known process the particles of the first precursor are already formed from a refractory ceramic material which does not undergo chemical conversions during the heat treatment. The binding of these particles to one another and to the ceramic material produced by the second precursor to form the continuous matrix can therefore take place only at the sintering temperature of these particles, that is to say in a very narrow and very high temperature range, relatively close to the melting point of the corresponding refractory material if an acceptable densification is required. This high treatment temperature entails a high energy consumption and, above all, limits the choice of reinforcing fibers, the latter having to be able to withstand the temperature in question. Moreover, this process does not permit the use of precursor particles which vary in chemical nature over the volume of the composite material, with a correlative variation in the sintering temperature, in order to obtain a final material having modulated properties.

The aim of the invention is to overcome these disadvantages and limitations.

To this end, in the process according to the invention, the fibrous structure is formed by stacking woven or nonwoven long fiber sheets previously filled with precursors, and each of these, during the production of the stack, constitutes an intermediate stage in a process for the preparation of a glass, vitreous ceramic or ceramic composition by the sol-gel route by hydrolysis and polycondensation using alcoholates or analogous compounds as the starting materials, the first precursor or interface precursor being in the form of a gel rich in water and the particles of the second precursor or matrix precursor containing only a few percent by mass of water and being able to sinter at a temperature substantially lower than the corresponding final composition produced by conventional ceramic or glassmaking methods. Moreover, the fibrous structure is compressed in the direction of stacking, during the heat treatment, in order to achieve good contact between the particles of the matrix precursor and in order to allow the gel to flow and substantially to fill all of the spaces left by the fibrous structure and by the matrix precursor particles.

The terms "matrix precursor" and "interface precursor" are used here solely for the purposes of distinction, taking account of the fact that, in the final product, the region of the matrix in the immediate vicinity of the fibers (interface in a general sense) has resulted from the precursor termed the interface precursor.

In the process according to the invention, the matrix precursor particles, prepared by the sol-gel route and not completely converted, are highly reactive and consequently are able to sinter to one another and to bind to the ceramic material originating from the interface precursor within a wide temperature range which consequently extends far below the melting point. However, although they contain only a few percent of water, they give rise, in contrast to those of the known process, to a consequent contraction.

Preferably, the fiber sheets are filled with the interface precursor by impregnation using a solution of appropriate reactants and gelling in situ, and they are filled with the matrix precursor by impregnation using a suspension of precursor particles in a volatile liquid vehicle, and drying.

These two impregnations may be carried out at the same time, using a suspension of matrix precursor particles in a solution of reactants leading to the interface precursor, or successively, the fiber sheets previously filled with the interface precursor being impregnated with a suspension of matrix precursor.

Several successive impregnation-gelling and/or impregnation-drying cycles may be carried out using identical or different interface precursors and/or identical or different matrix precursors.

Simultaneous impregnation with the interface precursor and the matrix precursor, which may or may not be followed by a separate impregnation with a matrix precursor, permits better filling of the interstices in the fiber sheet in the case where the latter is not very dense.

According to one variant, a preliminary heat treatment of the interface precursor is carried out, following impregnation and gelling in situ, in order to obtain a first coating of the fibrous structure consisting of discrete particles in contact with one another, after which a fresh impregnation is carried out, leading to the formation of an interface precursor, which is identical to or different from the preceding interface precursor.

All of said successive impregnation operations enable the degree of filling of the interstices in the fiber sheets to be improved. Moreover, the use of reactants or of particles which differ from one cycle to another makes it possible to combine elements which could not be introduced simultaneously, or could be introduced simultaneously only with difficulty. Special effects may also be obtained, for example an increase in the reactivity due to concentration gradients, during the heat treatment. An interface precursor may also lead, during the heat treatment of the stack of filled fiber sheets, to the formation of a molten composition which reacts with one or more adjacent solid compositions, of different chemical formulae, resulting from one or more different interface precursors and/or matrix precursors, in order to form a solid composition at the same temperature.

The latter effect is obtained by choosing the precursor under consideration in such a way that the composition to which it leads by heat treatment approximately corresponds to a minimum melting point in the corresponding phase diagram. As soon as the melting point is reached, the composition becomes liquid and reacts very rapidly with the adjacent compositions in the solid state in order to form an overall composition which no longer corresponds to the minimum melting point and is consequently itself also in the solid state.

The invention also provides for the addition, to a suspension of matrix precursor particles, of well-crystallized particles suitable for use as nucleating agents during the heat treatment, in order to confer specific physical properties, such as toughness, heat convection, and the like.

In order to improve the continuity between the layers of composite material corresponding to the different stacked sheets, it is possible, immediately prior to the superposition of two filled sheets, to spread on the first of said sheets a supplementary layer of a solution or a suspension analogous to those which have been used for their impregnation.

According to an important characteristic of the invention, the sheets whose fibers have a chemical or physical nature which differs from one sheet to another and/or which are filled with matrix precursors and/or interface precursors which differ from one sheet to another are stacked. In fact, the wide temperature range permitted for the heat treatment makes it possible to select a temperature compatible with matrix compositions differing from one layer to another. Moreover, the low treatment temperatures permit a wide range of reinforcing fibers.

The various types of layers may be combined in accordance with any desired scheme. For example, an alternating succession of two or more types of layers may be used in order to combine properties which cannot be combined in a single layer. A skin consisting of one or more layers of a nature different to those forming the core of the composite material may be used to protect the latter against heat or against external agents, both in respect of the physical properties (hardness, color and the like) and of the chemical properties (corrosion and the like).

Of course, the fiber sheets of the different layers may differ not only in respect of the chemical nature of the fibers but also in respect of their mode of combination: felt or woven, type of weave, relative orientation of the woven fibers.

Preferably, the stack of sheets is subjected, in the stacking direction, to a pressure which is sufficient to cause the interface precursor gel to flow into the interstices between the fibers but is below the pressure causing rupture of the fibers, during a first heat treatment step, and to a pressure of at least approximately 70 bars during a second step, the first step ending and the second step starting when the temperature rises beyond a threshold between 500° and 800° C., the latter corresponding to the initiation of sintering/densification mechanisms. The pressure exerted during the first step also has the effect of reducing the apparent volume of the stack in a ratio of the order of 2 to 1. The higher pressure during the second step ensures that the matrix precursor particles are in good contact with one another and with the particles produced by drying the interface precursor gel. This pressure may advantageously assume values which increase, continuously or stepwise, depending on the contraction accompanying the conversion of the precursors.

In the case where a precursor is used which gives rise to the formation of a molten phase during the heat treatment, it is advantageous to detect the appearance of traces of this phase and to interrupt or slow down the rise in temperature in response to this appearance, so as to allow this phase the time to develop homogeneously in the volume of the material and to achieve the desired degree of reaction.

The process according to the invention permits the use of one or more matrix precursors leading to a composition containing alkali metals, and one or more interface precursors leading to a composition which does not contain alkali metals or contains said metals in a lower proportion. The fibers are thus less exposed to the corrosive action of alkali metal ions than if a matrix having the same overall composition had been obtained from a precursor or precursors having a uniform proportion of alkali metals.

In the case where the fibers are based on silicon carbide, it is advantageous to use an interface precursor obtained from a solution containing at least one reactant and/or a solvent containing a hydrocarbon chain having at least three carbon atoms. The precursor gel then retains traces of such reactants and/or solvents, these traces leading, during the heat treatment, to the production of carbon oxides and thus concurrently to the formation of a layer of carbon at the surface of the fibers, while delaying the crystallization of the fibers.

The invention also provides types of composite materials which the process according to the invention makes it possible to obtain and which it was not previously known how to produce. The materials in question are, in particular, a composite material formed from fibers based on carbides, nitrides or carbonitride and a matrix of the NASICON type of formula $M_{1+x}M'_2Si_xP_{3-x}O_{12}$, in which M represents a metal chosen from Na, Li, K and Ag, M' represents a metal chosen from Zr and Ti and/or the combination thereof, and x is between 0.2 and 3. This formula may be modified by partially replacing Zr and Ti by Sc, Mg and/or Ta, and by correlatively increasing the amount of M in order to compensate for the charge deficit. A composite material of this type may be obtained in particular by using a matrix precursor and an interface precursor leading to compositions of the above formula in which x is 2 and close to 0 respectively, the interface precursor, owing to its low alkali metal content, protecting the fibers against attack by the ions of these metals, which otherwise would destroy them. The juxtaposition of the two precursors promotes the formation of precipitates.

Another type of composite material which the invention makes it possible to obtain is formed from fibers based on silicon carbide and a matrix comprising a phase of the pseudo-brookite type of formula $Al_2O_3.xTiO_2$, in which x is between 0.5 and 4, although to date it has been possible to obtain a phase of this type only by sintering at very much higher temperatures, which necessarily lead to a reaction (sticking between the matrix and the fibers) preventing the production of a good composite.

Other characteristics and advantages of the invention will become apparent from the detailed description given below of a few illustrative embodiments and from the appended drawings, in which:

In FIG. 6, the determination is carried out at 900° C. in air, FIG. 7 corresponds to a sample heated at 1470° C. in air, but broken at 20° C.;

Figure 1:
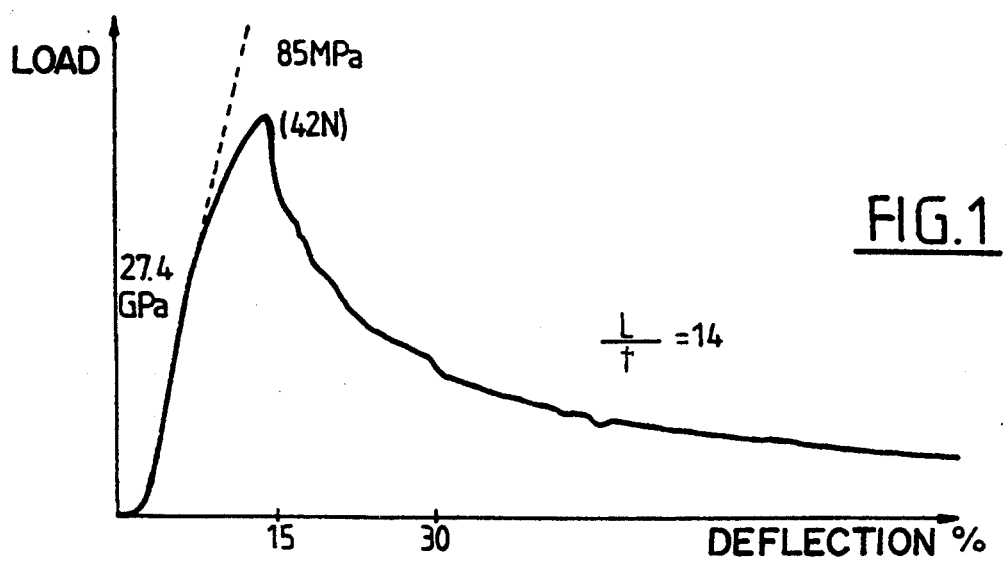
FIGS. 1 to 4 are three-point load-deflection bending diagrams recorded at 20° C., relating to various composite materials according to the invention.

The process according to the invention as used in the examples below may be divided into the following steps:

1—Preparation of the fiber sheets.

2—Preparation of the matrix precursor powder.
3—Deposition of the interface precursor.
4—Deposition of the matrix precursor.
5—Production of the stack.
6—Baking.
7—Finishing.

A general description of each of these steps is given below.

Step 1: Preparation of the Fiber Sheets

The starting sheet, which may be, in particular, a commercially available woven fabric, for example a woven fabric of 1-directional (1D), 2-directional (2D), 3-directional (3D) or polydirectional type, depending on the number of different directions in which the long fibers extend, is first cut to the appropriate shape. For some types of fibers, for example the silicon carbide fibers termed NICALON, it may be necessary to carry out a chemical or thermal degreasing in order to remove the deposit applied to facilitate weaving. To this end, the woven fabric may be immersed in a mixture of equal volumes of acetone and ethanol for several days. In other cases, for example for mullite fibers marketed by 3M under the name Nextel, a preliminary heat treatment enables optimum mechanical properties to develop.

Step 2: Preparation of the Matrix Precursor in the Form of a Very Fine and Highly Reactive Powder The reaction is carried out by hydrolysis/polycondensation of a mixture of hydrolyzable reactants generally termed alcoholates, alkoxides or esters, characterized by the presence of an atom in the final composition to be obtained bonded to a carbon chain via an oxygen atom. Other reactants compatible with the above may, if necessary, be mixed with the latter, for example silanes, such as vinyltrimethoxysilane and vinyltriethoxysilane, marketed under the trade name Dynasilan by DYNAMIT NOBEL, chlorosilanes, aminosilanes or even siloxanes having at least one hydrolyzable branch. An intimate mixing step at between 30° C. and the boiling point, generally 110° C., promotes the homogeneity by the development of transesterification and polycondensation reactions. A controlled atmosphere containing traces of water and/or oxygen is generally necessary at this stage. The mixture is then hydrolyzed, with vigorous stirring, by means of an aqueous solution containing, if necessary, a certain number of dissolved salts. This operation may take place in air. After evaporation of the solvents liberated by the reaction (water, alcohols), in the atmosphere, in an oven or under radiant heaters, a fine powder is thus obtained, the chemical formula of which is that of an oxide containing hydroxyl deficiencies and retaining water in its pores. A typical composition is $MO_{2-x}(OH)_{2x}$ 3 to 6 $H_2O$. This amorphous gel powder has the appearance of a dry powder. If necessary, any aggregates are removed by breaking up in a mortar and dynamic sieving, or passing through a cyclone. This powder is then dead-burned, typically at between 500° and 800° C. for at least 2 hours, in order to obtain a powder having the desired reactivity and use characteristics. This treatment gives rise to the departure of the majority of water molecules and OH groups, which corresponds to a loss in mass of the order of 20 to 30%. At this stage, the powder is generally amorphous and porous and contains a few percent by mass of water, this water being either incorporated in the structure or adsorbed at the surface, including the surface of the pores. It then retains a low sintering temperature, but could be suspended in an adequate concentration. It has an average diameter not exceeding about 1 micron.

Step 3: Deposition of the Interface Precursor

A liquid mixture of reactants corresponding to the same general definition as those used for the preparation of the matrix precursor is prepared, to which mixture solvents, such as alcohols, acetone or hexane, and a few parts per thousand to a few percent of polymers, such as those sold under the names Arlacel and ween, registered trademarks of ICI (Imperial Chemical Ind.), are added if necessary. These additives serve to adjust the viscosity of the mixture, it being possible for the solvents also to lead to the production of carbon oxides during the heat treatment, as explained above. A prehydrolysis of the reactants may be carried out before impregnation in order to increase the viscosity or reduce the contraction during gelling. In addition, the polycondensation is promoted by a mixing/stirring operation at approximately between 30° and 110° C., and by the resulting transesterification. If the hydrolysis is too rapid, these operations must be carried out in a glovebox. After dilution in a solvent, the operations may generally be carried out in air. The fiber sheet is immersed in the bath obtained, or the sheet is coated using a brush, and it is brought into contact with water vapor (either in the ambient air or in a controlled atmosphere in an oven or an autoclave), at a temperature of between 20° and 300° C. The simultaneous hydrolysis and polycondensation reactions lead to gelling, as described in FR-A-2 545 003. As indicated above, several successive impregnating and gelling cycles may be carried out using identical or different precursors.

As also indicated, it is also possible, in certain cases, to carry out a heat treatment at between 500° and 1000° C. in order to densify a first interface precursor deposit before carrying out a second impregnation and hydrolysis cycle.

Step 4: Deposition of the Matrix Precursor

For this step it is possible to use, in whole or in part, a commercial powder having the characteristics indicated above with regard to Step 2. The powder is suspended, for example in chlorobenzene, in particular in a proportion of 20 to 60 g of powder per 100 $cm^3$, adding about 6% by weight of polymethyl methacrylate. Monocrystals or whiskers promoting the nucleation may also be added. After stirring, a homogeneous suspension is obtained, with which the fiber sheet previously filled with interface precursor in Step 3 is impregnated, using a brush or by immersion. After evaporation of the solvent, the deposit hardens. Several coating and drying cycles, in air or in an aerated atmosphere, are generally necessary in order to introduce the desired amount of powder.

Step 5: Production of the Stack

The sheets filled in accordance with Steps 3 and 4 are, if necessary, cut to the desired dimensions and then stacked in the desired sequence. A layer of the bath used in Step 3 or of the suspension used in Step 4 may be deposited on each sheet before covering it with the following sheet.

Step 6: Heat Treatment

The stack produced in Step 5 is placed in a mold, generally made of graphite, in order to carry out sintering under load. A pressure of less than 100 bar is applied, gradually or stepwise, at the rate at which the temperature rises, in order to ensure a good contact between the powder particles, a necessary condition for effective sintering to occur at low temperature. The presence of the interface precursor in the gel state makes it possible, because of its viscous fluid properties, to distribute the pressure homogeneously without the risk of spoiling the fibers. A pressure of between 100 and 250 bar, depending on the nature of the constituents present, is applied before the start of the nucleation/-densification process associated with the onset of hydroxyl deficiencies, although the powder is still highly reactive, that is to say above a temperature threshold between 500° and 800° C. The sintering temperature of the material in the composite is about 100° C. higher than the temperature at the end of contraction which is observed on the expansion curve of the same solid composition.

A dynamic vacuum, at least up to 500° C., promotes the removal of the solvents contained in the gel. Subsequently, the vacuum may be replaced by a neutral gas atmosphere ($N_2$,Ar), for example in order to prevent the degradation of silicon carbide fibers. The pressure is generally relieved a few minutes before the end of the temperature plateau, so as not to induce excessive strains during cooling if the latter is rapid.

A liquid phase is obtained, for example, during the heat treatment if gelled tributyl borate is used as interface precursor. The temperature at which this liquid phase appears is then between 950° and 1100° C.

Step 7: Finishing

Slight machining of the surfaces of the composite material may be carried out after cooling and release from the mold.

The reducing atmosphere of carbon oxides produced by the traces of solvent protects the silicon carbide fibers and contributes to the formation, at the surface of the latter, of a carbon-rich layer, which modifies the interactions between the fibers and the matrix. A dissipative fracture is thus obtained for the composite material, as is shown in FIGS. 1 to 4, which are load-deflection diagrams obtained by three-point bending at ambient temperature for various samples of composite materials reinforced by silicon carbide fabrics.

FIG. 1 relates to a composite material having a matrix of lithium aluminosilicophosphate reinforced by a 4D fabric. The interface precursor is gelled hydrolyzed tributyl borate.

Figure 2:
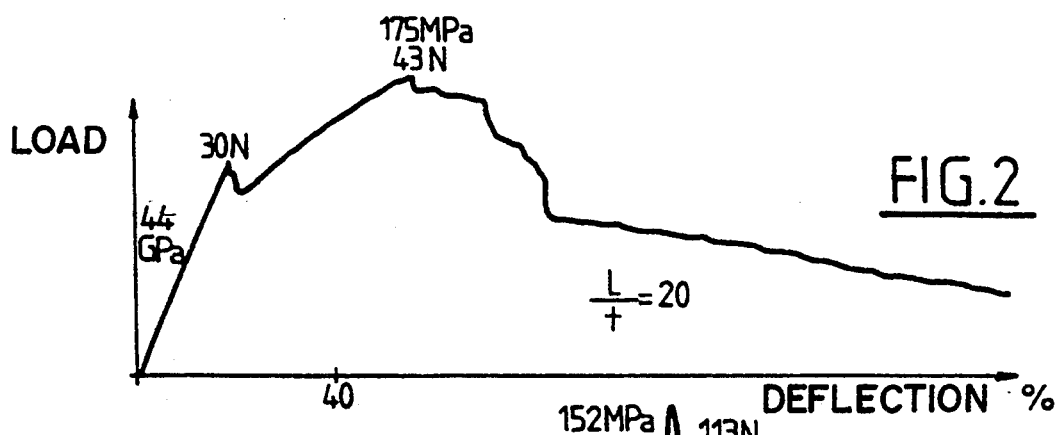

FIG. 2 relates to a composite material having an $Al_2TiO_5$ matrix reinforced by a 2D satin. Interface precursor: aluminum butoxide and gelled hydrolyzed titanium butoxide.

Figure 3:
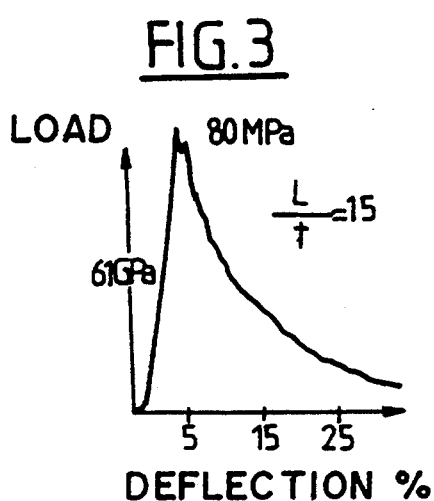

FIG. 3 relates to a composite material formed from a matrix of zirconiumdioxide containing calcium and reinforced by a 1D fabric with a calcium borosilicate glass interface. The interface precursor is (tributyl borate+calcium salicylate+silicon tetraethoxide)+gelled hydrolyzed zirconium propoxide.

Figure 4:
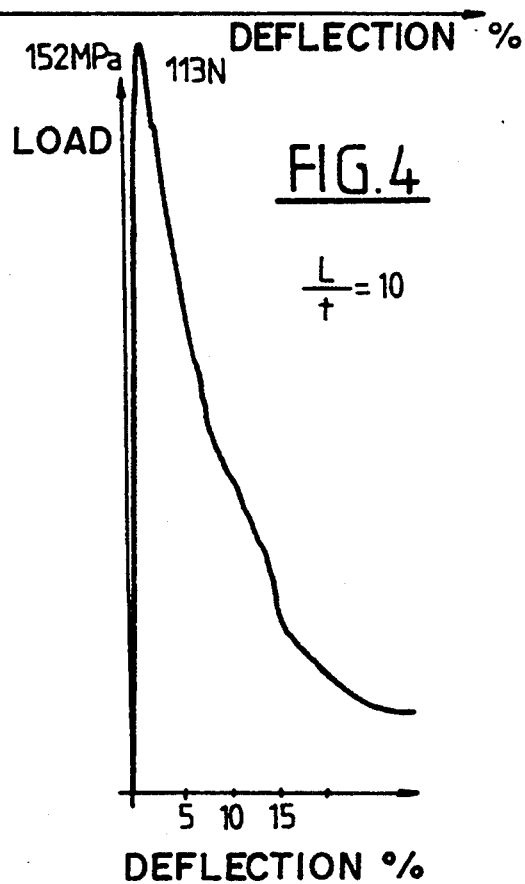

FIG. 4 relates to a composite material formed from a matrix of NASICON x=1.9, $Na_{2.9}Zr_2Si_{1.9}P_{2.1}O_{1.2}$ reinforced by a 4D fabric; interface precursor zirconium propoxide+tributyl phosphate+gelled hydrolyzed tributyl borate. In this figure, the notation L/e corresponds to the ratio between the spacing between supports and the thickness of the sample (slenderness). The progressive fracture of the materials is evidence of the dissipative character of the fracture.

The main characteristics of the various examples below are summarized in the table. The first column of this table gives the composition of the impregnating solution used for the interface precursor. The second column indicates the nature of the matrix precursor powder.

The various types of fabrics used as fiber sheets are indicated in the third column. The SiC fabrics are made from Nicalon NLM 202 fibers, manufactured by Nippon Carbon, which have an average diameter of 13 microns, in the form of strands of about 500 fibers. Three types of fabrics are produced from these filaments:

a 1D fabric having 11 filaments per cm, manufactured by Brochier, with a soluble 100 denier filament weft;

an 8 2D satin, manufactured by Brochier under the reference E2140; and a 4D fabric manufactured by CRST (21350 Gissey le Vieil) under the reference CYS 5086.

TABLE

| | Interface precursor (liquid) | Metrix precursor (powder) | Fabric | T/P (°C./bars) | $V_F$ | $\kappa_0$ (%) | $\rho$ | $\sigma$ (MPa) (E in GPa) |
|---|---|---|---|---|---|---|---|---|
| 1 | Tributyl borate (1 vol) + Si—O—Al ester (3 vol) | Mullite: B $3Al_2O_3 - 2SiO_2 - 0.1B_2O_3$ | SiC 4D | 1350/160 | 0.37 | 13.5 | 2.7 | 110 (36) |
| 2 | | Mullite: B | SiC 1D sheet | 1330/200 | | 13.5 | 2.65 | 130 (35) |
| 3 | Si tetraethoxide (1.9 vol) + Zr propoxide (1.7 vol) + tributyl phosphate | NASICON $Na_{20}Zr_2Si_{1.9}P_{1.1}O_{12}$ | SiC 4D | 1040/200 | 0.45 | 7 | 2.6 | 190 (55) |
| 4 | (3.1 vol) + tributyl borate (3.2 vol) | | SiC 1D | 1035/200 | | 4.5 | 2.65 | 290 (85) |
| 5 | Si—O—Al ester (3 vol) Acetone (1 vol) | } + Mullite $3Al_2O_2 2SiO_2$ | Nextel 440 2D taffetas | 1200/200 | 0.37 | 9 | 2.75 | 80 (120) |
| 6 | Zirconium propoxide | Stabilized zirconium dioxide $ZrO_2.MgO$ $9.5ZrO_2.5MgO$ | SiC 1D sheet | 1355/150 | | 24 | 4 | 105 (60) |
| 7 | 1st layer: tetraethoxysilane + tributyl borate + calcium salicylate + 2-propanol | $ZrO_2$:Ca $7.7ZrO_2.2.3CaO$ | SiC 1D sheet | 1400/200 | 5 | | 4 | 80 (70) |

TABLE-continued

| Interface precursor (liquid) | Matrix precursor (powder) | Fabric | T/P (°C./bars) | $V_F$ | $\kappa_0$ (%) | $\rho$ | $\sigma$ (MPa) (E in GPa) |
| --- | --- | --- | --- | --- | --- | --- | --- |
| 2nd layer: zirconium propoxide + calcium salicylate | | | | | | | |
| 8 Zirconium propoxide + Ca salicylate + isopropanol | $ZrO_2$:Mg | SiC 1D sheet | 1456/210 | | 22 | 4.15 | 100 (52) |
| 9 Al butoxide (2.5 vol) + Ti butoxide (3.5 vol) + propanol (4 vol) | $Al_2TiO_5$ | SiC 2D sheet | 1270/160 | | 18 | 2.95 | 175 (44) |
| 10 Tributyl borate (1 vol) + acetone (1 vol) | 1AS:P $0.5Li_2O.Al_2O_3$ $2.5SiO_2.0.5P_2O_5$ | SiC 4D | 1200/70 | 0.48 | 14 | 2.4 | 90 (41) |
| 11 | | | 1150/200 | 0.42 | 5 | 2.24 | 130 (41) |
| 12 | | SiC satin | 1150/200 | 0.47 | 5.8 | 2.4 | 120 (42) |
| 13 Bi-layer | 1AS:P + $0.5Li_20.2Al_2O_3.5SiO_2$ — $P_2O_5$ $0.5B_2O_3$ | SiC 4D | 1150/200 | | 3.8 | 2.1 | 90 (45) |
| 14 Bi-layer ditto 7 (4 plies) + ditto 2 (4 plies) | $ZrO_2$:Ca + Mullite:B | SiC 1D sheet | 1400/200 | | 7 | 3.2 | 60 (30) |
| 15 Ditto 14 but alternately stacked plies (multilayer) | | | 1350/200 | | 7 | 2.9 | 104 (80) |
| 16 Zr propoxide + acetone | 1As:P.Zr.Ti | Nextel 440 taffetas | 1100/200 | 0.17 | 8.5 | 2.6 | 70 (37) |

The other type of fibers is made of mullite, which fibers are manufactured by 3M under the reference NEXTEL 440, have an average diameter of close to 10 microns and are grouped in strands of 390 units. These fibers are woven in the form of taffetas by Cotton Frères. The mass per unit area of the fabric is 100 g/m².

In the following columns T and P represent, respectively, the maximum temperature and the maximum pressure during the heat treatment, $V_F$ represents the volume fraction of the fibers in the composite material, $\pi_0$ represents the open porosity, $\rho$ the density, $\sigma$ the three-point bending strength and E Young's modulus. The deflection in % is defined with respect to the thickness of the sample. The load is applied at a speed of 0.3 mm/min.

EXAMPLE 1

Step 1

The fabric of NICALON SiC fibers, which has a mass per unit volume of 0.76 g/cm³, is cut into 4 cm × 15 cm strips and then immersed for at least three days in a solution of equal volumes of acetone and ethanol, the solution being replenished.

Step 2

The matrix precursor of mullite type, the final composition of which is $3Al_2O_3$-$2SiO_2$-$0.1B_2O_3$, is prepared from a mixture of aluminum secondary butylate (s-butoxide), silicon tetramethoxide and tributyl borate dissolved in isopropanol.

The mixing and the opening of reactant bottles must be carried out in a glove-box free from moisture in order to prevent too rapid hydrolysis of the most hygroscopic reactant, in this case aluminum butoxide, which is a source of inhomogeneity.

In order to prepare 40 g, or 0.1 mol, of matrix precursor, 152.82 cm³ of aluminum butoxide, 29.64 cm³ of silicon tetramethoxide, 5.39 cm³ of tributyl borate and 200 cm³ of propanol are used.

The mixture is stirred mechanically for at least 15 min before placing the solution in open air. It is, however, recommended to avoid moist atmospheres.

The mixture is then transferred into a vessel of large volume (3 liters), where it is possible to effect vigorous mechanical stirring with, at the same time, the introduction of a large excess of water (500 cm³, or close to 40 times the amount of water necessary for the hydrolysis reaction). This makes it possible to obtain a gel in which both the hydroxyl radical content and the content of water impregnating the pores are minimal and thus to reduce the contraction. Stirring is continued for at least 30 min. A first evaporation of alcohols, that is to say that used as solvent and those liberated by the hydrolysis/condensation reactions, results. The gel suspension is then poured into two large crystallizers arranged under infrared radiant heaters at a distance of about 20 to 30 cm in order to prevent ignition of the alcohols or the formation of a crust. This drying takes place under a ventilated hood. Over a period of about 10 hours a fine powder is obtained which dis-integrates on touching (snow-like appearance). Aggregates may be broken up in an agate mortar. The powder, formed of porous aggregates about 0.05 to 0.5 micron in size, is then arranged in the form of shallow beds (of a few millimeters) in alumina boats and dead-burned for 24 hours at between 700° and 800° C. in a well-ventilated furnace. After cooling the powder is dynamically sieved through a 50-micron sieve in order to remove any aggregates present and stored in hermetically sealed flasks.

Step 3

The degreased and dried fabric is immersed in a mixture of alcoholates (or alkoxides) suitable for producing the interface precursor gel. Alternatively, impregnation may be carried out using a brush. A mixture of one volume of tributyl borate and 3 volumes of Si—O—Al ester $(C_2H_5O)Si$—O—Al—$(sec—OC_4H_9)_2$, reference Si—Al—O 84 Dynasil (registered trademark) supplied by Hulls France, is used. This mixture has previously been homogenized for at least 15 min, a sheet of plastic film protecting the liquid from atmospheric moisture. The coated fabric is then exposed to the ambient air for several tens of hours in order to develop the hydrolysis/polycondensation reactions which will convert the liquid deposit into a viscous liquid and then into a hard gel. A second impregnation may be carried out if the amount deposited is insufficient. It is necessary to achieve a mass per unit area for the deposit which is of the order of 0.07 g/cm$^2$, determined after hardening.

Step 4

21 g of the matrix precursor powder previously prepared are dispersed in 50 ml of chlorobenzene in the presence of 2 g of polymethyl methacrylate for at least 30 min. The sheet is impregnated, using a brush, with this homogeneous suspension. Two layers are deposited successively on each side of the sheet, laid flat on a suitable surface, drying for about 1 hour being carried out after each coating. The deposit changes from a deep gray color at the time of coating to a light color after drying, and hardens. Its mass per unit surface area is 0.15 to 0.20 g/cm$^2$.

Step 5

After complete drying, which takes about 10 hours, three pieces of coated fabric 3.6 cm × 3.6 cm in size are cut and stacked, a layer of matrix precursor suspension being deposited on each of the first two pieces before the following piece is put in place.

Step 6

The stack is inserted between two Papyex (registered trademark, LE CARBONE LORRAINE) graphite paper sheets of the same dimensions, in order to prevent sticking to the graphite mold in which the whole is arranged. The mold is itself placed in heating/sintering equipment suitable for carrying out the desired temperature and pressure program. Heating is at a rate of 200° C. per hour from 30° to 400° C. and then at 500° C. per hour from 400° to 1350° C. This is followed by a 90-min plateau. The furnace is allowed to cool freely (drop of 100° C. in 5 min, of 500° C. in 1 hour and of 1000° C. in 4 hours). The sample is subjected to a primary vacuum during heating up to 500° C. and then to a static N$_2$ atmosphere. A pressure of 70 bars is applied from 530° C. and is raised to 160 bars at about 760° C., the rise in pressure being regular over the course of several minutes, and the pressure is removed a few moments before the end of the plateau. Cooling takes place under primary vacuum from 500° C.

The differential thermal analysis curve of the system of materials deposited on the fabric shows a transient liquid phase at about 1018° C., which permits good sintering, and then, after reaction is complete, permits a dissipative interface to develop which withstands heat treatments at high temperature in an oxidizing atmosphere. Following homogenization by means of said baking heat treatment, the melting point of the whole remains higher than 1600° C. The loss in mass during the baking cycle is close to 30%. This corresponds to the discharge of solvent residues and of traces of water from the matrix precursor and from the interface precursor gel. This leads to a reducing atmosphere rich in CO(CO$_2$) which protects the silicon carbide fibers.

Step 7

After the furnace has cooled, the mold is removed and the sample released from the mold. The Papyex sheets are removed by scraping or any other method (mechanical or by combustion at 500° C.). The open porosity is determined by water absorption and buoyancy. Microphotographs show that this porosity is mainly located in the fiber sheet, which roughly corresponds to a porosity of 20% in the porous part.

Figure 5:
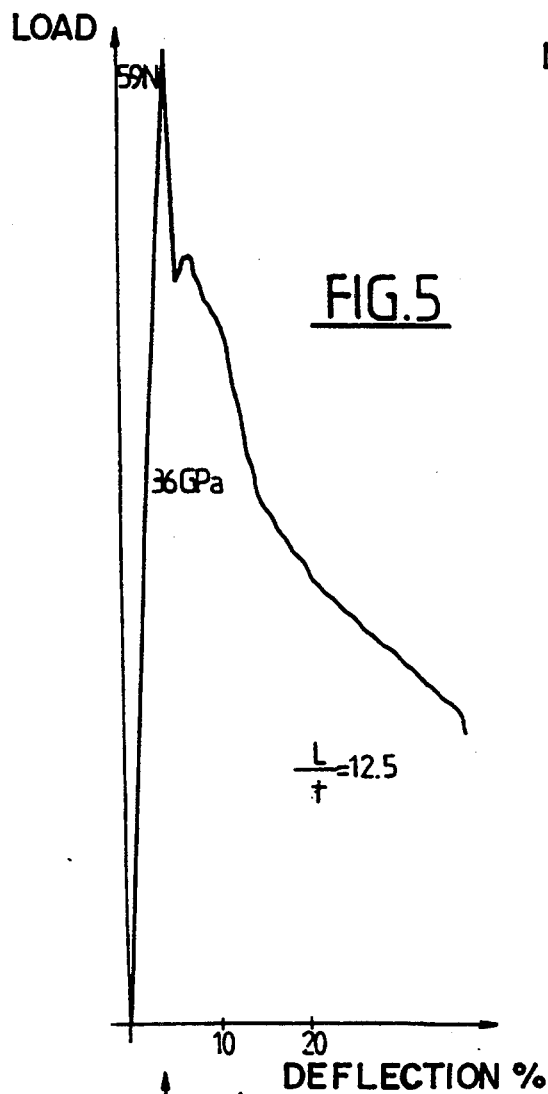
FIGS. 5 to 7 are three-point load-deflection bending diagrams recorded under different conditions for a given composite material where the matrix is a mullite and the interface precursor tributyl borate and a gelled hydrolyzed mixed alkoxide Si-O-Al.
Figure 6:
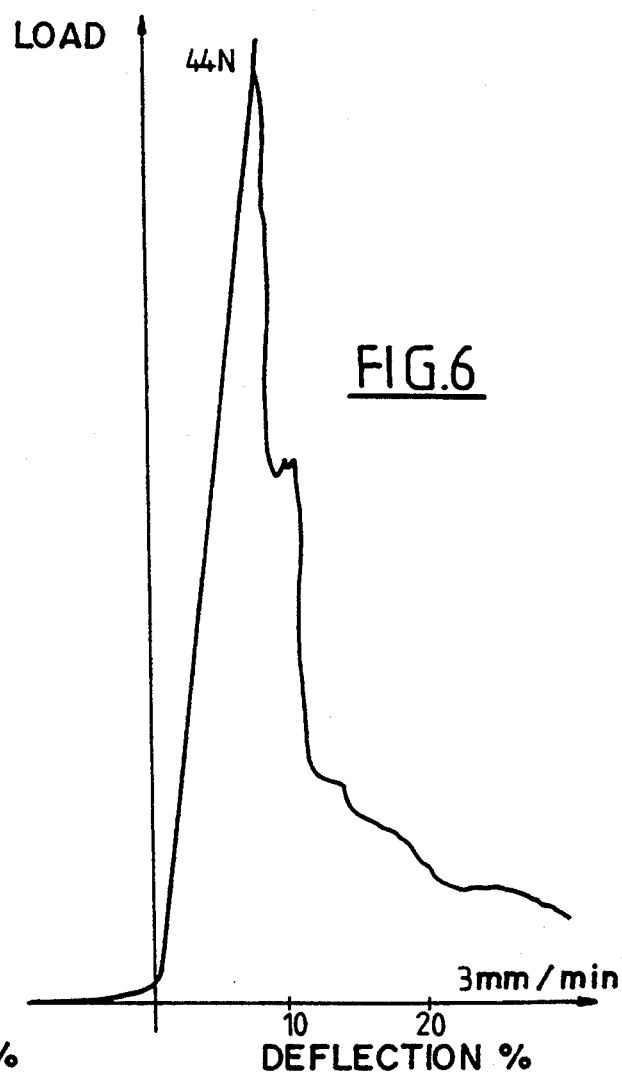
Figure 7:
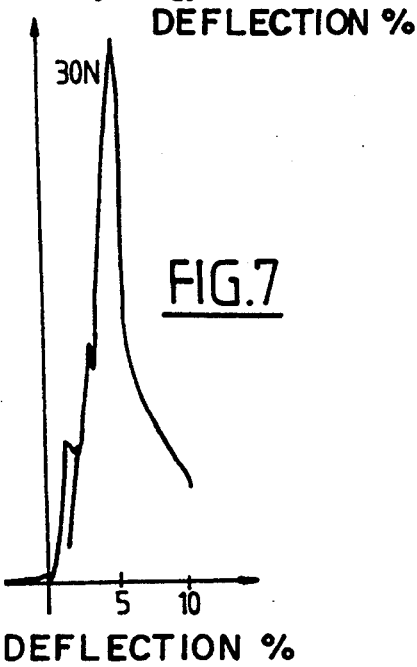

The parameters for the three-point bending test are as follows: distance between supports: 30 mm; rate of application of the load: 0.3 mm per min. The bending curve at 20° C. shows a dissipative fracture (FIG. 5). The average value $\sigma$ may exceed 110 MPa. The same test carried out at 900° C. in air leads to a strength of 110 MPa with a fracture which is still slightly dissipative (FIG. 6). The same is true for a sample whose strength is determined at 20° C., after having been heated at 1470° C. for 3 hours in air (FIG. 7). The strength then falls by 50%. X-ray analysis and electron microscopy show that the matrix is still partially in the form of amorphous mullite.

EXAMPLE 2

The procedure is essentially the same as in Example 1, the differences being indicated below and in the table.

The fibers of the 1D SiC fabric are held by two soluble 100 denier filaments, serving as weft at the ends of the 10 cm × 10 cm sheet.

In step 3, two layers of liquid mixture are deposited at an interval of one week.

In step 4, two layers of suspension formed from 20.8 g of mullite powder, 50 ml of chlorobenzene and 2 g of polymethyl methacrylate are deposited.

During stacking, it is ensured that the fibers of all of the layers are properly parallel.

During the heat treatment, heating is at a rate of 200° C. per hour from 20° to 400° C. and then at 500° C. per hour from 400° C. to 1330° C., where a 90-min plateau is observed. A pressure of 100 bars is applied up to 450° C., of 155 bars from 540° C. and of 205 bars from 650° C. up to the end of the plateau. Recording of the piston movement shows that sintering takes place between 750° and 1000° C., virtually as in Example 1.

The properties are given in the table.

The omission of boron from the matrix precursor leads to a substantial increase in the Young's modulus, which rises to 100 GPa, the breaking strength being 160 MPa. In fact, the addition of boron delays crystallization of the mullite matrix, which leads to a reduction in the Young's modulus.

EXAMPLE 3

In this and in the following examples, unless indicated to the contrary, step 1 is identical to that of the preceding examples using the same fabric (4D in this case).

A powder of composition Na$_{2.9}$Zr$_2$Si$_{1.9}$P$_{2.1}$O$_{12}$ with a 2% mole excess of sodium is prepared by method 2 described by Ph. Colomban, Adv. Ceramics 21 (1987), 139–154. The organic phase, consisting of 46.79 g of zirconium propoxide, 20.19 g of tetraethoxysilane (TEOS) and 100 ml of 2-propanol, is mixed for 15 min, with mechanical stirring, in a beaker covered by a plastic film. The mixture is then poured into a large vessel (1 liter) containing 200 ml of distilled water, 7.41 g of NH$_4$H$_2$PO$_4$ and 5.970 g of NaOH. Vigorous stirring is carried out at the same time during mixing of the two liquids and is then continued for about 1 hour. The gel suspension is then poured into large crystallizers under radiant heaters, in order to remove the alcohol solvents. Over a period of 24 hours, a fine white powder is obtained. This powder is arranged in boats (see Example 1) and subjected to heat treatment at 760° C. under air for 27 hours. The powder is then dynamically sieved and then stored in hermetically sealed flasks.

Step 3

The deposition of the interface precursor takes place in accordance with a procedure analogous to that of Example 1: using a brush, a layer of mixture consisting of 12.07 g of silicon tetraethoxide, 12.74 g of zirconium propoxide, 20.87 g of tributyl phosphate and 19.06 g of tributyl borate, representing, in oxide equivalents, the ratios 2.8/1/1.44/1.51, is deposited on the fabric strip. The operation is repeated on the other side of the fabric after drying the first deposit.

After deposition, the coated fabric is exposed to ambient air for several days, in order to achieve complete hydrolysis/polycondensation. A hardening of the deposit is observed at the same time. After 5 days, the mass per unit surface area of the deposit is 0.1 g/cm$^2$.

Step 4

In a beaker, 8.5 g of matrix precursor powder are dispersed in 48 ml of chlorobenzene in the presence of 1.5 g of polymethyl methacrylate. Stirring is carried out for 2 hours. The fabric filled with interface precursor is coated with the matrix precursor suspension, using two layers per side, awaiting bleaching of the preceding deposit before each fresh deposition, which is an indication of the removal of the bulk of the solvent. The mass per unit area of the deposit is 0.1 g/cm$^2$. At the end of deposition, the holes in the 4DIR fabric are filled and the surface of the sheet is smooth.

Step 5

The stack comprises four plies about 4 cm×4 cm in size. The total mass of the stack before baking is 11.22 g.

Step 6

The heating rate is 160° C./hour up to 400° C. and then 400° C. per hour up to the plateau at 1040° C., which lasts for 45 min. Cooling is free (100° C. in 5 min, 500° C. in 1 hour and 1000° C. in 5 hours). A primary vacuum is applied up to a temperature of 720° C. and a 1-bar N$_2$ atmosphere is then applied. The pressure is fixed at 70 bars from 700° C. and then raised to 200 bars at 800° C. up to the end of the plateau. The loss in mass during baking is 23%.

The bending test is carried out using an L/e ratio of 10 and leads to a mechanical strength in excess of 150 MPa, with a dissipative fracture, as is shown by the charge/deflection diagram (FIG. 4) and examination by photomicrography of the fracture faces. Using high magnification it is possible to observe the formation of a layer around the fibers as well as the precipitation of monoclinic zirconium dioxide, which phase can also be seen in the X-ray diffraction patterns alongside the peaks of the NASICON phase. This homogeneous precipitation of zirconium dioxide takes place mainly in the zone resulting from the conversion of the interface precursor.

EXAMPLE 4

Step 1: The fabric is a 1D SiC sheet, cf. Example 2.

Step 2

See Example 3.

Step 3

The deposition of the interface precursor takes place in two successive layers. Each drying/hydrolysis/polycondensation operation takes one week under a relative humidity of about 60%.

Step 4

The deposition of the matrix precursor also takes place in two layers, the suspension containing 10 g of powder in 30 ml of methylene chloride with 2.07 g of polymethyl methacrylate.

Step 5

Eight sheets are stacked under the conditions described in Example 3.

Step 6

The baking temperature cycle is also identical to that of Example 3. The pressure is fixed at 100 bars from 518° C. and is raised to 150 bars from 637° C. and to 200 bars from 732° C. until 5 min before the end of the 45-min plateau at 1035° C. This plateau temperature is 250° C. below the melting point of the matrix, which is about 1285° C., as is shown by the differential thermal analysis curve.

The three-point bending test is carried out using an L/e ratio of about 21 (see table).

EXAMPLE 5

Step 1

The Nextel 440 fibers forming the fabric are polycrystalline and are composed, by weight, of 70% Al$_2$O$_3$, 28% SiO$_2$ and 2% B$_2$O$_3$. Their density is 3.1 and their diameter from 8 to 9 microns. The fabric is cut into 4 cm×32 cm strips and subjected to a heat treatment suitable for developing the mechanical strength, comprising an 8-hour plateau in air at between 720° and 730° C. followed by a 6-hour plateau in air at 950° C. The mass per unit surface area is about 110 g/m$^2$.

Step 2

A mullite powder of formula 3Al$_2$O$_3$-2SiO$_2$-0.1TiO$_2$, the titanium being supplied from titanium butoxide, is prepared as in Example 1.

Steps 3-4

Two heat-treated fabric strips are immersed in a beaker containing the mixture:
30 ml of Si-Al ester
10 ml of acetone
1 g of powder prepard in step 2
which has previously been subjected to mechanical stirring.

The strips are withdrawn and placed to dry for 4 or 5 hours. Coating may be carried out, using a brush, in several layers, until the holes are filled. The mass of the deposit is about 3.5 g per strip, or about 0.03 g/cm$^2$.

Step 5

After drying, 15 4 cm×4 cm pieces are cut and stacked, a layer of suspension being deposited between each ply.

Step 6

The stack is placed between two boron nitride pistons. The graphite mold is coated with boron nitride.

After placing in the furnace-press, a primary vacuum is applied. The baking cycle is as follows:

| | |
|---|---|
| 0 to 400° C. | 200° C. per hour |
| 400 to 1250° C. | 500° C. per hour |
| plateau at 1200° C. | 60 min |

Pressure is applied from the start of heating (=25 bars) and then gradually raised to 70 bars at about 500° C. and then to 200 bars at about 750° C. up to the end of the plateau.

Cooling is determined by the inertia of the furance.

Step 7

After cooling and release from the mold, the open porosity is determined in water by the buoyancy method.

The strength measured in the three-point bending test (3 cm between supports, load of 0.3 mm/min) is modest (80 MPa), but corresponds to a dissipative fracture even at 900° C. by extraction of the fibers. The mechanical properties are not perceptibly affected after heating in air at 1200° C.

A preliminary deposition of zirconium propoxide on the fabric, followed by baking at 1200° C., before step 3–4, enables the mechanical properties to be substantially improved.

EXAMPLE 6

Step 1 (cf. Example 2)

Step 2

The matrix precursor $95ZrO_2.5MgO$ is prepared by hydrolysis/polycondensation of a solution of zirconium propoxide and magnesium acetate in a large excess of propanol. The mixture is prepared in a glove-box in the absence of traces of water in order to prevent the start of hydrolysis of the magnesium acetate powder, which would make it difficult to dissolve. The whole is then heated at the boil for 15 min in order to develop the homogeneity and to obtain complete dissolution. The solution is then transferred to a 3-liter reactor provided with vigorous mechanical stirring. About 2 liters of water are added, with vigorous mechanical stirring, in the course of 3 hours. The gel suspension is then poured into two large crystallizers under infrared radiant heaters. Over a period of about ten hours under a ventiiated hood, a fine powder is obtained. After grinding once in a mortar, the powder is deposited as a shallow bed in alumina boats and dead-burned for 26 hours at 700° C. in air. The powder is then stored in hermetically sealed flasks. The curve showing contraction as a function of the temperature shows that it sinters at between 1100° and 1200° C.

Step 3

The fabric sheet is coated with zirconium propoxide on one side using a brush. Hydrolysis/polycondensation is carried out over a period of a few hours. When the degree of gelling is adequate, the sheet is turned over for coating on the other side. Hydrolysis/polycondensation is complete in about ten hours.

Step 4

In a beaker, 18 g of the powder prepared in step 2 are dispersed, with mechanical stirring, in 50 ml of 1,1,1-trichloroethane in the presence of 4 g of poly(methyl methacrylate). Stirring is continued for 30 min. The fabric sheets coated in step 3 are coated, using a brush, with two .layers of this suspension in order to obtain a deposit having a smooth surface.

Step 5

After drying, the deposit having hardened, the coated sheets are cut to a size of 4 cm×4 cm and the plies are stacked, the suspension from step 4 serving to stick the plies to one another. Two sheets of Papyex are arranged on either side of the stack.

Step 6

Baking is carried out in a graphite mold under primary vacuum. The heating rate is 200° C./hour up to 400° C. and 500° C./hour up to 1355° C., with a 90-min plateau. Cooling is free as in the other examples. Pressure is applied stepwise: 100 bars from 460° C. and 150 bars from 650° C. to the end of the plateau.

Step 7

After cooling and release from the mold, the Papyex sheets are removed from the product. The mechanical characteristics are given in the table. Fracture is dissipative. Electron microprobe and X-ray diffraction analyses indicate that the material comprising the matrix resulting from the conversion of the two precursors is perfectly crystalline.

EXAMPLE 7

Step 1

See Example 6.

Step 2

9.4 g of calcium salicylate $C_{14}H_{10}CaO_6 2H_2O$ are dissolved at 50° C. in 1 liter of isopropanol; 40 ml of zirconiumpropoxide are added and the solution is stirred hot for 30 min, a plastic film covering the beaker preventing contact with the moisture in the air. The solution is then transferred to a 3-liter reactor provided with vigorous mechanical stirring. 18 ml of water are then added, stirring being continued for 3 hours. The gel suspension is poured into two wide crystallizers under radiant heaters. In the course of about 10 hours, under a hood, a fine powder is obtained, which is broken down in a mortar. This powder is deposited as beds in alumina boats and dead-burned for 26 hours at 700° C. in air. Dynamic sieving is then carried out and the powder is stored in a hermetically sealed flask. The contraction curve shows that this powder sinters at between 1200° and 1300° C. The amorphous powder becomes cubic at about 500° C. and then gradually monoclinic and tetragonal again above 1200° C.

Step 3

A first layer of gel-forming agent corresponding to a final oxide composition $3SiO_2—1B_2O_3—1CaO$ is prepared as follows:

40 ml of tetraethoxysilane, 15.8 ml of tributyl borate, 20.5 g of calcium salicylate and 15 ml of 2-propanol are poured into a beaker. The mixture is brought to the boil in order to dissolve the calcium salicylate completely. The sheet is immersed in this mixture and suspended for several hours until there is complete hardening resulting from hydrolysis/polycondensation. The mass per unit area of the deposit is 0.05 g/cm$^2$.

After drying, a second layer based on zirconium propoxide and calcium salicylate is deposited as described in Example 8 below.

Steps 4 and 5

These are identical to those of Example 6, stacking of the sheets being carried out so as to keep the fibers of all of the plies parallel.

Step 6

The temperature cycle differs from that of Example 6 in that heating at 500° C./hour is continued up to 1400° C., where the 90-min plateau is produced. A pressure of 25 bars is applied from 20° C. and is increased to 100 bars at 460° C., which initiates a first densification, and then gradually increased so as to reach 200 bars at 660° C. Sintering starts at about 900° C. and is virtually complete at about 1300° C.

An optical photomicrograph of the composite material obtained shows a good densification of the zirconium dioxide layers.

The load/deflection diagram is given in FIG. 3. A good dissipative fracture is obtained.

EXAMPLE 8

Step 2

The matrix precursor is prepared by hydrolysis/polycondensation as in Example 6.

Step 3

A mixture of 40 ml of zirconium propoxide, 9.4 g of calcium salicylate and 12 ml of isopropanol is prepared at the boil and with stirring and is deposited under the same conditions as in Example 6. The mass per unit area of the deposit is 0.05 g/cm$^2$.

Step 4

In a beaker, 18 g of the matrix precursor powder are dispersed, with stirring, in 50 ml of 1,1,1-trichloroethane in the presence of 4 g of poly methyl methacrylate. Stirring is continued for 30 min. The fabric sheets coated in step 3 with interface precursor are coated, using a brush, with two layers of this suspension in order to obtain a deposit having a smooth surface, on each side. The drying time between two layers, under a ventilated hood, is about 2 hours. The mass per unit area which is deposited is 0.05 g/cm$^2$.

Step 5

After complete drying (about ten hours), the deposit having hardened, the coated sheets are cut to a size of 4 cm×4 cm. Eight plies are stacked, the suspension from step 2 serving to stick the plies. Two sheets of Papyex are arranged on either side of the stack.

Step 6

The heat treatment is carried out under primary vacuum, in accordance with the following cycle:

Rise at 200° C. per hour up to 400° C. and then at 500° C. per hour up to 1450° C; 90-min plateau at the latter temperature. Cooling is free (100° C. in 5 min, 500° C. in 1 hour, 1000° C. in 5 hours). Pressure is applied stepwise: 100 bars at 460° C., 150 bars at 595° C. and then 210 bars from 660° C. up to a few moments before the end of the plateau.

The load/deflection curve shows a good dissipative fracture.

EXAMPLE 9

Step 1

The fabric, Brochier satin reference E2140, is prepared as described in Example 1.

The powder is obtained by hydrolysis/polycondensation of a mixture of 101.2 cm$^3$ of aluminum s-butoxide and 68.4 cm$^3$ of titanium butoxide in 68.4 cm$^3$ of isopropanol free from traces of water.

The mixture is stirred at 80° C. for 1 hour in the absence of atmospheric humidity. The alcohol solution and then 360 cm$^3$ of water are poured into a wide reactor, with vigorous stirring. Stirring is continued for 1 hour. The powder is then transferred into wide crystallizers and dried under infrared radiant heaters, under a ventilated hood. The powder obtained is dead-burned at 740° C. for 28 hours and then prepared as indicated in the preceding examples. The contraction curve shows a first stage of reduction in volume below 300° C. corresponding to the removal of the solvents (water and alcohols). Sintering/densification extends from 700° to 1350° C. approximately, in several steps because of the nucleation of the various crystal phases, the pseudobrookite phase appearing at about 1000° C.

Step 3

In this example the interface precursor is chosen such that, in the final composite material, the composition is the same in contact with the fibers and within the matrix. A mixture of 12 cm$^3$ of aluminum butoxide, 17 cm$^3$ of titanium butoxide and 20 cm$^3$ of propanol free from traces of water is prepared in a glove-box. The mixture is stirred at 60° C. for 30 min.

Three successive layers of this solution are deposited on the fabric, on the front face, then on the back face and finally on the front face, with an interval of a few hours between each coating. The coated fabric is exposed to the air, the moisture in the air enabling hydrolysis/polycondensation reactions to take place. The mass of the deposit is 0.616 g per gram of fabric.

Step 4

When the coated fabric is dry (the deposit is hard and brittle, the weight of the deposit being stable), 15 g of the dead-burned powder from step 3 are suspended in 50 g of methylene chloride and 2 g of polymethyl methacrylate, the suspension is stirred and layers of suspension are deposited alternately on the two sides of the fabric until a deposit of 0.977 g of powder per gram of fabric is obtained, the fabric being dried until the deposit bleaches and hardens after each coating.

Step 5

After complete drying, four plies 3.6 cm×3.6 cm in size are cut and stacked, a layer of tributyl borate being deposited, using a brush, on each of the first three plies. Papyex sheets are placed on either side of the stack.

Step 6

The heating rate is 160° C. per hour up to 400° C. and then 400° C. per hour up to 1270° C., this temperature being maintained for 90 min. The heat treatment is carried out under primary vacuum; cooling is free.

A pressure of 70 bars is applied from 650° C., that is to say before the start of the sintering/densification/nucleation process. The pressure is raised to 160 bars at 813° C. and held until the end of the plateau. The contraction curve recorded during sintering shows that densification takes place mainly between 850° and 1050° C.

The 3-point bending fracture curve in FIG. 2 shows a mechanical strength reaching 175 MPa, with a highly dissipative behavior, doubtless related to the presence of the $Al_2TiO_5$ phase, prepared by the sol-gel route and formed above 1000° C.

A similar behavior is obtained with the $Al_2Ti_3O_9$ composition.

EXAMPLE 10

Step 1 (cf. Example 1)

Step 2

In a glove-box free from water vapor, the following reactants are mixed in a beaker for 30 min in order to obtain 67.6 g (0.1 mol) of dead-burned powder:

101 cm$^3$ of aluminum s-butoxide, 74 cm$^3$ of silicon tetramethoxide, 54.7 cm$^3$ of tributyl phosphate and 230 cm$^3$ of propanol. This mixture is prepared in a glove-box in order to prevent any uncontrolled hydrolysis of the aluminum butoxide. Stirring is continued at 60°–80° C. for 30 min outside the glove-box, the mixture being protected from the atmosphere by a plastic film. In addition, an aqueous solution of 13.8 g of lithium nitrate is prepared in 684 cm$^3$ of water.

The alcohol solution is then poured into a wide reactor (3 liters) provided with a powerful mechanical stirring device. When this stirring is adequate, the aqueous solution is poured in rapidly and stirring is continued for 1 hour. The suspension obtained is then poured in equal parts into two large crystallizers and then placed under infrared radiant heaters under a hood for evaporation. At the end of about ten hours, a fine powder is obtained which is broken down by sieving and then deposited as beds a few millimeters thick in alumina boats. This powder is then dead-burned at 830° C. under air for 27 hours. Dynamic sieving through a 50-micron sieve is then carried out.

Step 3

The fabric cut into 4 cm×25 cm strips is coated, using a brush, on boths sides with a mixture of equal volumes of tributyl borate and acetone, previously homogenized with mechanical stirring for at least 15 min. The beaker containing the solution is covered with a plastic film in order to prevent evaporation of the acetone. The tributyl borate/acetone ratio influences the amount of gel which will be deposited. The coated fabric is then hydrolyzed in ambient air for 7 days. About 0.02 g/cm$^2$ of hydrated boron oxide deposit is obtained on the fabric.

Step 4

20 g of powder prepared in step 2 are dispersed in 50 cm$^3$ of monochlorobenzene with 3 g of polymethyl methacrylate with stirring with a bar magnet for 30 min. The matrix precursor is then deposited, using a brush, on the two sides of the fabric in the number of layers necessary to fill all of the free spaces in the fiber network. After each coating it is necessary to wait until the layer deposited has dried.

The deposit obtained is about 0.13 g/cm$^2$. The interface precursor deposit represents 15% of the mass of the matrix precursor deposit and 27% of the mass of the fabric.

Step 5

After complete drying, or about 1 day, three plies are cut to the dimensions of the mold, which are 3.6 cm×3.6 cm, and stacked with the weave directions crosswise. A thin layer of matrix precursor suspension is deposited on each of the first two plies.

Step 6

Sintering under load is carried out in a graphite mold placed between the pistons of a graphite resistance furnace. The heating rate is 160° C./hour from 20° to 500° C. and 220° C./hour from 500° to 1200° C., a 90-min plateau being observed at the latter temperature. Cooling is not controlled: the temperature falls by 300° C. in 10 min and by 700° C. in half an hour.

A pressure of 70 bars is applied at 750° C. and maintained up to a few moments before the end of the plateau. A primary vacuum is maintained in the furnace until the pressure is applied and the chamber is then filled with nitrogen under 1.2 bars up to the time of cooling.

The loss in mass during the heat treatment is 38%.

A test piece having a cross-section of 3.1 mm×4.8 mm gave a three-point bending breaking stress of 88 MPa (travel speed: 0.5 mm/min; spacing distance: 30 mm) at ambient temperature. The strength falls to 43 MPa at 900° C. in air, Young's modulus being 22 GPa. The micrograph of an unpolished section shows a good densification and good filling of the interstices in the fabric. The fracture faces show a long extraction length of the fibers, which is in agreement with the highly dissipative load/deflection curve. Microprobe and electron diffraction analysis shows that the resulting matrix is mainly amorphous with crystallites 100 mm or less in size.

After heating at 1000° C. for 5 hours in air, the average value of the breaking stress of two test pieces similar to the above reaches 120 MPa with dissipative fracture.

EXAMPLE 11

Steps 1 to 5

These are similar to those of Example 10, except that the powder is dead-burned at 700° C.

Step 6

The rise in temperature is carried out as in Example 3 up to the plateau temperature of 1150° C., which is maintained for 90 min. The rate of fall is 250° C. per hour down to 850° C. The primary vacuum is applied to the chamber throughout the treatment. A pressure of 25 bars is exerted on the sample from the start of the cycle; it rises to 70 bars at 400° C. and then to 200 bars at 700° C.

The thickness of the sample obtained is 1.74 mm.

The load/deflection curves are comparable to the example of FIG. 1.

The fracture load is 86 MPa for a Young's modulus of 27.5 GPa. The micrograph after polishing shows the good filling of the fabric by the matrix. The transmission electron micrograph shows white nanoprecipitates, mainly of beta-spodumene and mullite, in a mainly vitreous matrix. The average value of the bending strength is about 130 MPa.

By modifying step 3 with respect to the example which has just been described, the weight ratio between the amount of interface precursor and that of matrix precursor may be varied. Comparison of the microstructures and of the mechanical strengths shows that this parameter has a substantial influence, the best mechanical properties being obtained for a ratio of between 10 and 17%, at which values a slight separation of fibers and matrix is observed.

These values are not reduced by heating for several hours in air at 1000° C.

EXAMPLE 12

The production process is analogous to that of Example 11, except in respect of the following points.

Step 1

The Brochier satin 8 fabric has a density of 1.05 and a mass per unit area of 430 g/m$^2$.

Steps 2 to 4

The method is the same as for Example 5. The boron hydrate deposit is about 0.025 g/cm$^2$. The boron hydrate/powder ratio is 32% by mass and the boron hydrate/fabric ratio is 60% by mass.

Step 5

Five plies are stacked in the manner described in Example 3, taking account of the small thickness of the fabric.

The final sample has a thickness of 1.73 mm. The mechanical bending strength, which is in excess of 120 MPa at 25° C., reaches 140 MPa after heating in air at 1000° C. The strength determined at 900° C. in air is in excess of 87 MPa. Fracture is highly dissipative in all cases.

EXAMPLE 13

Step 1 (cf. Example 1)

Step 2

On the one hand, an LAS:P matrix precursor powder identical to that of Example 10 and, on the other hand, in a similar manner, another powder having the composition Li$_2$O—2Al$_2$O$_3$—5SiO$_2$—P$_2$O$_5$—0.5B$_2$O$_3$ are prepared. To this end, 96.1 cm$^3$ of aluminum butoxide, 73.7 cm$^3$ of tetramethoxysilane, 54.4 cm$^3$ of tributyl phosphate and 27 cm$^3$ of tributyl borate are mixed with 251.2 cm$^3$ of propanol, using a mechanical stirrer, for about 1 hour. This solution is then poured into a reactor and vigorous stirring is continued during the rapid addition of 738 cm$^3$ of water containing 6.9 g of dissolved lithium nitrate.

After stirring for one hour, the mixture is poured as a thin layer into crystallizers which are arranged under infrared lamps in order to ensure evaporation of the excess liquid. The powder obtained is then sieved through a 50-micron sieve and calcined at 750° C. for 27 hours. It is re-sieved through a 50-micron sieve before use.

Step 3

The fabric strip is coated with a mixture of equal volumes of acetone and tributyl borate on both sides. It is then left to stand in air for hydrolysis.

The amount of boron hydroxide deposit is 0.02 g/cm$^2$, or 31 g per 100 g of fabric, determined after hydrolysis/gelling.

Step 4

The fabric strip is divided into two equal parts. Using a brush, a suspension containing 15 g of the first powder prepared in step 2, 2.2 g of poly(methyl methacrylate) and 37 cm$^3$ of monochlorobenzene is applied to one of these parts. The amount deposited is 0.13 g/cm$^3$ of fabric. On the other part, a mixture of 12 g of the second powder, 1.8 g of poly(methyl methacrylate) and 30 cm$^3$ of monochlorobenzene is deposited in the same way. The amount deposited is 0.13 g/cm$^3$ of fabric. The weight ratio of interface precursor/matrix precursor is about 18%.

Step 5

Two fabric plies in the dimensions of the mold are cut from each of the impregnated pieces. The two plies containing the second powder are stacked first, followed by the two plies containing the first powder.

Step 6

The operating conditions are the same as in the preceding example.

The apparent density of the composite material is 2.06 and the actual density 2.40. The three-point bending mechanical strength is determined on samples 2 mm×4.5 mm×30 mm in size.

After heating for 2 hours at 700° C. and then for 2 hours at 1000° C. in air, the strength is reduced to 77.5 MPa and the modulus of elasticity to 24.5 MPa.

EXAMPLE 14

Step 1

The sheets of 1D fabric are prepared as in 10 Examples 7 and 8.

Step 2

The matrix precursor of zirconium dioxide partially stabilized by incorporation of calcium is prepared as in Example 7 and the matrix precursor of mullite:B as in Example 2.

Step 3

One sheet is coated as described in Example 7 and another as in Example 2.

Step 4

The first sheet mentioned in step 3 is coated with matrix precursor suspension as described in Example 7 and the second is coated as described in Example 2.

Step 5

The sheets are cut to a size of 3.6 cm×3.6 cm. Four plies of each of the two sheets are stacked separately and the whole is then superimposed, the sheets being bonded together with the aid of the suspensions of step 4.

Step 6

Sintering is carried out under primary vacuum using a heating rate of 200° C. per hour up to 400° C. and then of 500° C. per hour up to 1400° C. A pressure of 25 bars is applied from 25° C. and is raised to 130 bars at 513° C. and then to 180 bars at 647° C., to reach 200 bars at 780° C.

Recording of the movement of the piston shows that sintering essentially takes place between 900° and 1020° C., with a second contraction at about 1150° C. associated with the formation of a transient liquid phase with the boron.

The actual density, porosity deducted, is 3.2. It may be noted that the addition of zirconium dioxide in a multilayer structure does not introduce too great an increase in the density.

The three-point bending fracture is dissipative with the two types of matrix, the mechanical properties being better when fracture is effected on the mullite side.

EXAMPLE 15

This example differs from the preceding example only in that the two types of sheets are stacked alternately and in that the sintering temperature is limited to 1350° C. maintained for 30 min.

Figure 8:
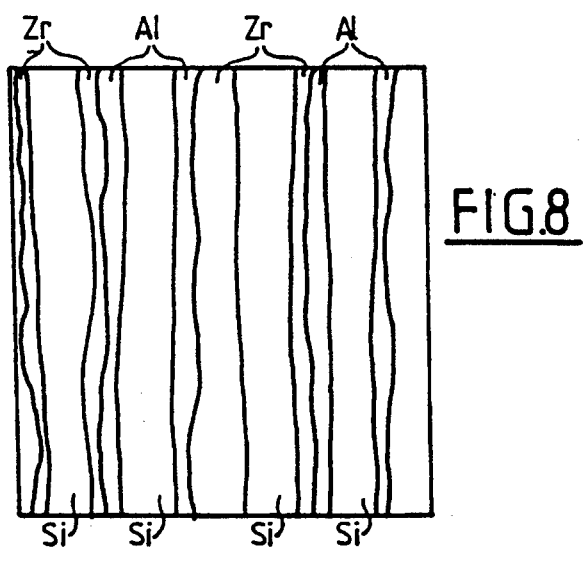
FIG. 8 shows the appearance provided by a composite material according to the invention in X-ray mapping for the elements Zr, Al and Si.

The actual density is 2.93. The appearance provided by X-ray mapping for the elements Si, Al and Zr is shown in FIG. 8. Bands of uniform width in which the element Si predominates (SiC fabric coated with converted interface precursor), bordered alternately by irregular bands in which Al and Zr respectively predominate (matrix based on mullite and on $ZrO_2$, respectively), are observed.

EXAMPLE 16

Step 1

Two strips of Nextel 440 mullite taffeta 300 mm × 400 mm in size are cut using a scalpel.

Step 2

The matrix precursor has the final composition $0.5 Li_2O—Al_2O_3—2.5SiO_2—0.5P_2O_5—0.1ZrO_2—0.1TiO_2$. In order to obtain 0.1 mol of powder, 101 cm$^3$ of aluminum tributoxide, 74 cm$^3$ of tetramethoxysilane, 54.5 cm$^3$ of tributyl phosphate, 3.4 cm$^3$ of titanium butoxide, 3.2 cm$^3$ of zirconium propoxide and 230 cm$^3$ of 2-propanol are mixed, with magnetic stirring, for 1 hour.

The mixture is then introduced into a reactor where it will be stirred vigorously. 680 cm$^3$ of water containing 13.8 g of lithium nitrate are then added rapidly.

After stirring for 1 hour, the suspension is poured into wide crystallizers placed under infrared radiant heaters in order to evaporate the solvent and the excess water. The powder obtained is sieved through a 50-micron sieve in order to separate the grains and is then calcined at 700° C. for 27 hours in air, in a shallow bed in alumina boats. At the end of this treatment it is sieved again through a 50-micron sieve in order to destroy any aggregates.

Step 3

The pre-cut fabric is coated, using a brush, with a mixture of equal volumes of zirconium propoxide and acetone. One layer is deposited on each side, the strips being suspended in air between the two operations for drying and hydrolysis. The deposit of hydrated zirconium oxide gel represents 32 g/m$^2$ of fabric. This deposit will form a chemical barrier protecting the fibers against attack by the matrix.

A heat treatment is then carried out in an electric furnace in ambient air at 1200° C. for 1 hour, with a rise in temperature of 20° C. per minute, cooling being natural. The zirconium oxide deposit obtained is 17 g/m$^2$ of fabric.

The further deposition of the same zirconium propoxide solution is then carried out, followed by exposure to moisture for the formation of an interface precursor gel by hydrolysis/polycondensation.

It is possible to replace the zirconium oxide by titanium oxide, tantalum oxide, niobium oxide and rare-earth oxide.

Step 4

The dead-burned matrix precursor powder is suspended in monochlorobenzene in an amount of 15 g per 30 cm$^3$ with 3 g of polymethyl methacrylate. After stirring with a bar magnet for 1 hour, this mixture is deposited on fabric strips so as to fill all of the interstices between fibers. This operation requires several coatings on each side, each coating followed by drying.

The amount of powder applied in this way is 500 g per m$^2$ of fabric.

Step 5

15 plies of coated fabric are cut and stacked, sticking them to one another with the aid of a small amount of matrix precursor suspension.

The temperature cycle is as follows: rise at 160° C. per hour from 20° to 500° C. and then at 220° C. per hour from 500° to 1100° C., 90-min plateau at 1100° C., then fall at 300° C. per hour down to 850° C., followed by natural cooling.

A pressure of 25 bars is applied from the start of the cycle in order to ensure good contact between the grains. At 360° C., the pressure is raised to 70 bars and then to 200 bars at 665° C. This pressure is released 5 min before the end of the sintering plateau.

The furnace chamber is placed under a dynamic vacuum throughout the entire cycle, until cooling is complete.

The final thickness is 3.25 mm, compared with 8.25 mm before sintering. Determination using a hydrostatic balance gives a porosity of 8.5% for an actual density of 2.57.

The bending strength of 70 MPa at 25° C. is virtually retained at 900° C. in air. It is noted that the extension of the fibers leads to a dissipative fracture at both low and high temperature.

As the operating parameters used in the various examples have not been optimized, an improvement in the properties of the composite materials may be expected by means of such an optimization.

We claim:

1. A process for the production of a composite material comprising a glass, vitreous ceramic and/or ceramic matrix reinforced by long ceramic fibers, and comprising the steps of: filling the interstices of a fibrous structure with at least a first precursor in the fluid state and with at least one second precursor in the form of discrete particles; and heat treating the whole to convert the first precursor and the second precursor into a continuous matrix, said process further comprising the steps of forming the fibrous structure by stacking woven or nonwoven long fiber sheets previously filled with the precursors for the preparation of the glass, vitreous ceramic or ceramic matrix by the sol-gel route by hydrolysis and polycondensation using alcoxides or analogous compounds as the starting materials, the first precursor being an interface precursor in the form of a gel rich in water and the particles of the second precursor being a matrix precursor containing only a few percent by mass of water and being able to sinter at a temperature substantially lower than the corresponding final composition, and wherein the fibrous structure is compressed in the direction of stacking, during the heat treatment, in order to achieve a good contact between the particles of the matrix precursor and in order to allow the gel to flow and substantially to fill all of the intersticial spaces of the fibrous structure and the particles, wherein at least one interface precursor leads, during the heat treatment of the stack of filled fiber sheets, to the formation of a molten composition which reacts with one or more adjacent solid compositions, of different chemical formulae, resulting from one or more different interface precursors and/or matrix precursors, in order to form a solid composition at the same temperature.

2. The process as claimed in claim 1, wherein the fiber sheets are filled with the interface precursor by impregnation using a solution of appropriate reactants and gelling in situ.

3. The process as claimed in claim 1, wherein said fiber sheets are filled with the matrix precursor by impregnation using a suspension of precursor particles in a liquid carrier, and drying.

4. The process as claimed in claim 1, wherein the fiber sheets previously filled with the interface precursor are filled with at least one matrix precursor by impregnation.

5. The process as claimed in claim 1, wherein at least two successive impregnation and drying and/or gelling cycles are carried out.

6. The process as claimed in claim 5, wherein the successive cycles use solutions of reactants of different chemical formulae and/or suspensions of particles of different chemical compositions.

7. The process as claimed in claim 5, wherein a heat treatment is carried out on the interface precursor filling the fiber sheets in order to obtain discrete particles coating the fibers, followed by a fresh impregnation leading to the formation of an interface precursor, which may be identical to or different from the preceding interface precursor.

8. The process as claimed in claim 1, wherein sheets of fibers of different types and/or which are filled with matrix precursors and/or interface precursors which differ from one sheet to another are stacked.

9. The process as claimed in claim 1, wherein the matrix precursor or precursors lead to a composition containing alkali metals and wherein the interface precursor or precursors lead to a composition which does not contain alkali metals or contains said metals in a lower proportion.

10. The process as claimed in claim 1, wherein the fibers are based on silicon carbide and wherein an interface precursor is obtained from a solution containing at least one reactant and/or a solvent containing a hydrocarbon chain having at least three carbon atoms, and contains traces of such reactants and/or solvents, these traces leading, during the heat treatment, to the production of carbon oxides and thus to the formation of a layer of carbon at the surface of the fibers.

11. A composite material obtained by the process of claim 1, formed from fibers based on carbide, nitride or carbonitride and a matrix of the NASICON type of formula $M_{1+x}M'_2Si_xP_{3-x}O_{12}$, in which M represents a metal chosen from Na, Li, K and Ag, M' represents a metal chosen from Zr and Ti and/or the combination thereof, and x is between 02. and 3, it being possible for Sc, Ta and Mg partially to replace Zr and Ti, the charge deficit then being compensated for by an excess of M.

12. A composite material obtained by the process of claim 1, formed from fibers based on silicon carbide and a matrix comprising a phase of the pseudo-brookite type of formula $Al_2O_3.xTiO_2$, in which x is between 0.5 and 4.

13. A process for the production of a composite material comprising a glass, vitreous ceramic and/or ceramic matrix reinforced by long ceramic fibers, and comprising the steps of: filling the interstices of a fibrous structure with at least a first precursor in the fluid state and with at least one second precursor in the form of discrete particles; and heat treating the whole to convert the first precursor and the second precursor into a continuous matrix, said process further comprising the steps of forming the fibrous structure by stacking woven or nonwoven long fiber sheets previously filled with the precursors for the preparation of the glass, vitreous ceramic or ceramic matrix by the sol-gel route by hydrolysis and polycondensation using alcoxides or analogous compounds as the starting materials, the first precursor being an interface precursor in the form of a gel rich in water and the particles of the second precursor being a matrix precursor containing only a few percent by mass of water and being able to sinter at a temperature substantially lower than the corresponding final composition, and wherein the fibrous structure is compressed in the direction of stacking, during the heat treatment, in order to achieve a good contact between the particles of the matrix precursor and in order to allow the gel to flow and substantially to fill all of the intersticial spaces of the fibrous structure and the particles, wherein the matrix precursor or precursors lead to a composition containing alkali metals, and wherein the interface precursor or precursors lead to a composition which does not contain alkali metals or contains said metals in a lower proportion.

14. The process as claimed in claim 13, wherein the fiber sheets are filled with the interface precursor by impregnation using a solution of appropriate reactants and gelling in situ.

15. The process as claimed in claim 13, wherein said fiber sheets are filled with the matrix precursor by impregnation using a suspension of precursor particles in a liquid carrier, and drying.

16. The process as claimed in claim 14, wherein the fiber sheets previously filled with the interface precursor are filled with at least one matrix precursor by impregnation.

17. The process as claimed in claim 13, wherein at least two successive impregnation and drying and/or gelling cycles are carried out.

18. The process as claimed in claim 17, wherein the successive cycles use solutions of reactants of different chemical formulae and/or suspensions of particles of different chemical compositions.

19. The process as claimed in claim 17, wherein a heat treatment is carried out on the interface precursor filling the fiber sheets in order to obtain discrete particles coating the fibers, followed by a fresh impregnation leading to the formation of an interface precursor, which may be identical to or different from the preceding interface precursor.

20. The process as claimed in claim 17, wherein sheets of fibers of different types and/or which are filled with matrix precursors and/or interface precursors which differ from one sheet to another are stacked.

21. The process as claimed in claim 13, wherein the matrix precursor or precursors lead to a composition containing alkali metals and wherein the interface precursor or precursors lead to a composition which does not contain alkali metals or contains said metals in a lower proportion.

22. The process as claimed in claim 13, wherein the fibers are based on silicon carbide and wherein an interface precursor is obtained from a solution containing at least one reactant and/or a solvent containing a hydrocarbon chain having at least three carbon atoms, and contains traces of such reactants and/or solvents, these traces leading, during the heat treatment, to the production of carbon oxides and thus to the formation of a layer of carbon at the surface of the fibers.

23. A composite material obtained by the process of claim 1, formed from fibers based on carbide, nitride or carbonitride and a matrix of the NASICON type of formula $M_{1+x}M'_2Si_xP_{3-x}O_{12}$, in which M represents a metal chosen from Na, Li, K and Ag, M' represents a metal chosen from Zr and Ti and/or the combination thereof, and x is between 02. and 3, it being possible for Sc, Ta and Mg partially to replace Zr and Ti, the charge deficit then being compensated for by an excess of M.

* * * * *